(12) United States Patent
Sabia et al.

(10) Patent No.: US 12,343,660 B1
(45) Date of Patent: Jul. 1, 2025

(54) UNDERDRAIN FOR WASTEWATER FILTRATION CONTAINER

(71) Applicants: Nicolas Sabia, Mississauga (CA); Vito Sabia, Mississauga (CA)

(72) Inventors: Nicolas Sabia, Mississauga (CA); Vito Sabia, Mississauga (CA)

(*) Notice: Subject to any disclaimer, the term of this patent is extended or adjusted under 35 U.S.C. 154(b) by 0 days.

(21) Appl. No.: 18/774,222

(22) Filed: Jul. 16, 2024

(51) Int. Cl.
*B01D 24/42* (2006.01)
*B01D 24/46* (2006.01)

(52) U.S. Cl.
CPC ....... *B01D 24/425* (2013.01); *B01D 24/4631* (2013.01)

(58) Field of Classification Search
None
See application file for complete search history.

(56) References Cited

U.S. PATENT DOCUMENTS

| | | | |
|---|---|---|---|
| 2019/0218764 A1* | 7/2019 | Ekholm | B01D 24/4631 |
| 2021/0229003 A1* | 7/2021 | Meurer | B01D 24/24 |

* cited by examiner

*Primary Examiner* — Magali P Slawski
*Assistant Examiner* — Bernadette Karen McGann
(74) *Attorney, Agent, or Firm* — Orin Del Vecchio

(57) ABSTRACT

An underdrain configured to be placed at the bottom of a wastewater container having media disposed therein wherein the present invention provides equally distributed flow over the entire filter bed. The present invention includes a base member having a planar bottom member with opposing lateral longitudinal leg members. A baffle member is operably coupled to the base member and superposed thereto. The baffle member is formed from four contiguous portions with the inner portions having an obtuse angle therebetween. The outer portions have an acute angle with the inner portion contiguous therewith. A top member is superposed the baffle member and has a plurality of apertures facilitating air scouring of the underdrain. A screen member is operably disposed over the baffle member and top member being arcuate in shape having lateral edges operably coupled with the base member. The screen member is manufactured from wedge wire screen material.

6 Claims, 2 Drawing Sheets

UNDERDRAIN FOR WASTEWATER FILTRATION CONTAINER

FIELD OF THE INVENTION

The present invention relates generally to wastewater treatment, more specifically but not by way of limitation, an underdrain configured to be placed at the bottom of a wastewater container having media disposed therein wherein the present invention provides equally distributed flow over the entire filter bed.

BACKGROUND

The process of filtration involves the physical separation of solids or impurities from the water. Normally, the filter aids in capturing the impurities that are contained in the wastewater. The wastewater treatment filter can be used to produce drinking water or any other water used for other purposes. There are many wastewater filters such as sand, cartridge, reverse osmosis, bag, and membrane filter among others. Each of these filters captures and removes large and small particles, organic substance or metals from water. Some filters may be used alone while others are used in combination with another filter to yield the desired result. Filtration is a process of removing suspended particles from wastewater. Filtration can be executed by straining, flocculation, sedimentation, or surface capture mechanism.

This process is very important because it allows the reuse of the same water thereby reducing the overall waste. The wastewater flows through a filter that is made from layers of sand and gravel. By collecting the impurities in the water, the filtration process enhances disinfection. There are different methods of wastewater filtration such as but not limited to gravity, hot, and vacuum filtration. All these filtration methods help in removing solid particles either from the water or gaseous fluids. Many configurations of wastewater treatment containers have a layer made of sand and gravel located at the bottom of the wastewater container. This filter bed helps in capturing solid materials that may be in the water. The water flows through the sand, the particles come into contact with the sand, and gets trapped in the pores. At the bottom of the wastewater container underneath the filtration media are underdrains. The underdrain is designed to capture the water and direct outwards from the container. Conventional underdrains are manufactured from plastic or metal and have intrinsic problems such as structural integrity which impacts operational specifications. Additionally, conventional designs do not respond well to air scouring.

Accordingly, there is a need for an underdrain for a wastewater filtration container wherein the underdrain is configured to be placed at the bottom of a wastewater container having media disposed therein wherein and provides equally distributed flow over the entire filter bed and further be constructed so as to be air scoured more effectively.

SUMMARY OF THE INVENTION

It is the object of the present invention to provide an underdrain for a wastewater container disposed at the bottom thereof wherein the present invention includes a base member having a planar bottom member.

Another object of the present invention is to provide a wastewater underdrain operable to provide normalized distributed flow thereacross wherein the base member includes opposing longitudinal leg members formed on the opposing longitudinal edges of the bottom member.

A further object of the present invention is to provide an underdrain for a wastewater container disposed at the bottom thereof wherein the present invention includes a baffle member operably coupled to the base member being superposed thereto.

Yet a further object of the present invention is to provide a wastewater underdrain operable to provide normalized distributed flow thereacross wherein the baffle member includes four contiguous portions all being angularly oriented with respect to each other.

Still another object of the present invention is to provide an underdrain for a wastewater container disposed at the bottom thereof wherein the present invention includes a top member operably coupled to the baffle member being on the top end thereof.

An additional object of the present invention is to provide a wastewater underdrain operable to provide normalized distributed flow thereacross wherein the top member includes a multitude of apertures formed therein.

Yet a further object of the present invention is to provide an underdrain for a wastewater container disposed at the bottom thereof wherein the present invention includes a screen member that is arcuate in shape and superposed the baffle member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
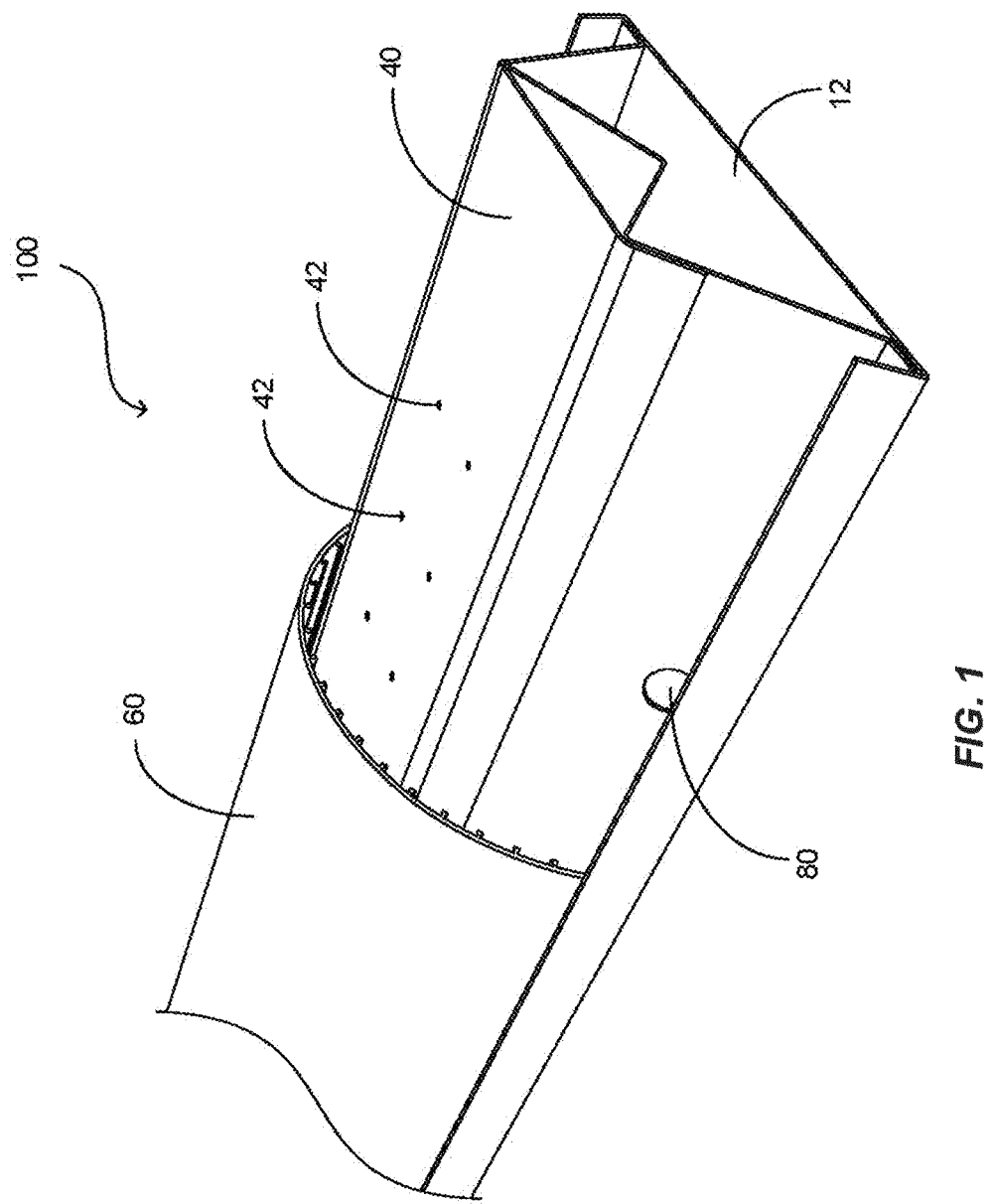
FIG. 1 is a perspective view of the present invention.
Figure 2:
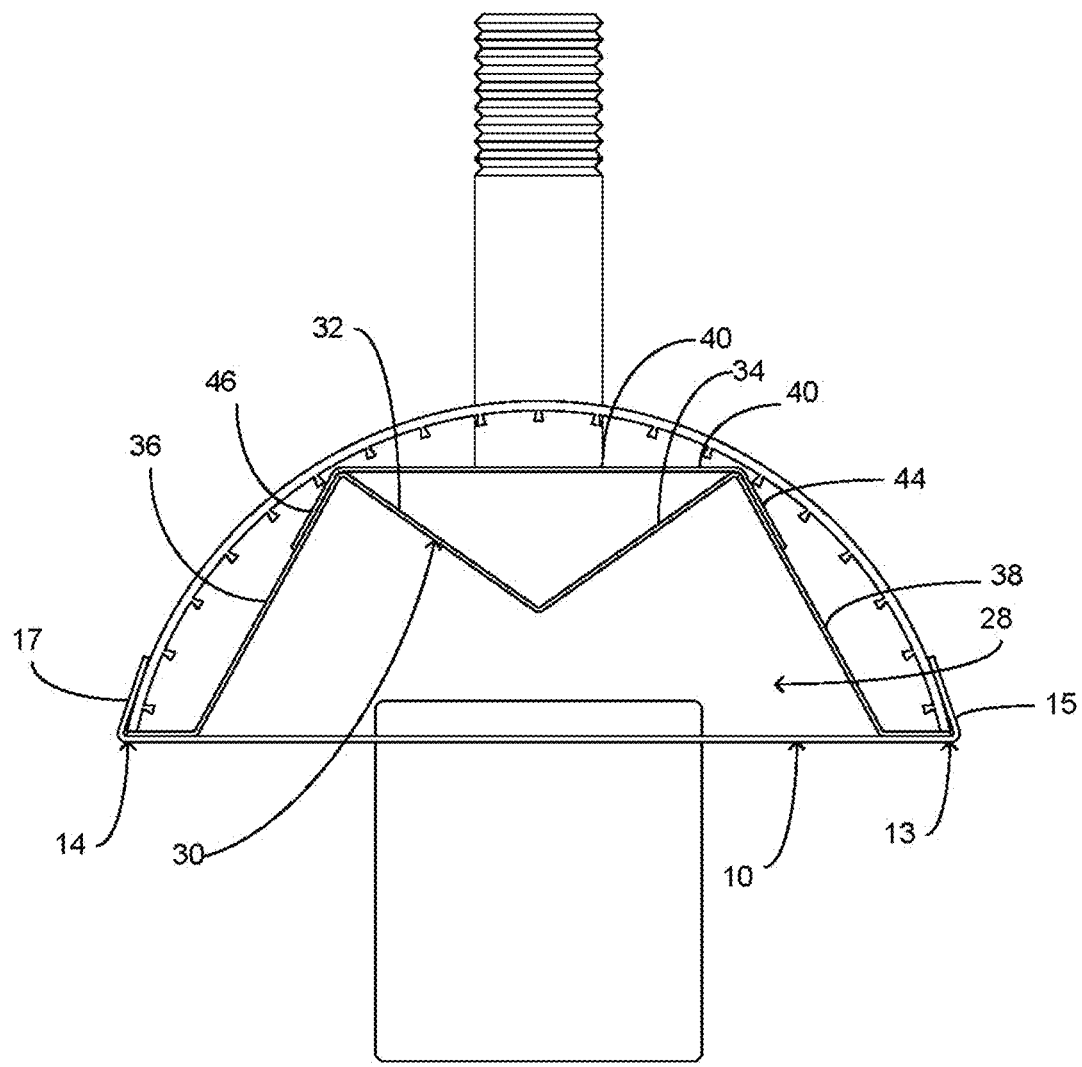
FIG. 2 is a cross-sectional view of the present invention.

Referring now to the drawings submitted herewith, wherein various elements depicted therein are not necessarily drawn to scale and wherein through the views and figures like elements are referenced with identical reference numerals, there is illustrated an underdrain for wastewater container 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the underdrain for wastewater container 100 is manufactured to be placed at the bottom of a wastewater container wherein the present invention is underneath suitable filtration media. It should be understood within the scope of the present invention that the underdrain for wastewater container 100 could be manufactured in alternate proportional lengths and widths in order to achieve the desired objective of equalized distribution of water flow across the underdrain for wastewater container 100. It should be further understood within the scope of the present invention that a single or multiple underdrain for wastewater container 100 could be placed at the bottom of a wastewater container. The underdrain for wastewater container 100 is manufactured from a durable corrosion resistant material such as but not limited to aluminum or galvanized metal.

The underdrain for wastewater container 100 includes a base member 10 wherein the base member 10 includes a bottom member 12. The bottom member 12 is planar in manner and having a first longitudinal edge 13 and a second longitudinal edge 14. Extending upward from the first longitudinal edge 13 and the second longitudinal edge 14 are the first longitudinal leg member 15 and second longitudinal leg member 17. The first longitudinal leg member 15 and second longitudinal leg member 17 are angularly oriented towards each other and function to secure the screen member 60 as is further discussed herein. It is contemplated within the scope of the present invention that the first longitudinal leg member 15 and second longitudinal leg member 17 could be oriented and various angles inwards towards each other and further be provided in alternate heights.

The first longitudinal leg member 15 and second longitudinal leg member 17 includes a baffle member 30 superposed the base member 10. The baffle member 30 extends the length of the base member 10 and is positioned thereabove having void 28 therebetween. Baffle member 30 includes four contiguous portions 32, 34, 36 and 38. Portions 32, 34 are centrally located on the baffle member 30 and having an obtuse angle therebetween. Portion 36 is contiguous with portion 32 wherein the angle therebetween is an acute angle. Portion 38 is contiguously formed with portion 34 and has an acute angle therewith. In a preferred embodiment the baffle member is generally M-shaped as this shape promoted an efficient shape for both water drainage and air scouring of the underdrain for wastewater container 100. Portions 36, 38 have formed therein water apertures 80. Water apertures 80 are formed in portions 36, 38 utilizing suitable techniques and function to permit water to flow into void 28 for drainage thereof. The water aperture 80 are formed in portions 36, 38 the length of the baffle member 30 intermediate the first end and second end thereof. It is contemplated within the scope of the present invention that the portions 36, 38 could have alternate quantities of water apertures 80 formed therein. Furthermore, it should be understood within the scope of the present invention that the water apertures 80 could be provided in alternate diameters.

Secured above the baffle member 30 is the top member 40. The top member 40 is operably coupled to the top of the baffle member 30 and extends the length thereof. The top member 40 is planar in manner having opposing lateral longitudinal edges 44, 46 that extend downward from the top member 40 and are adjacent portion 38, 36 respectively. The top member 40 has formed therein a multitude of apertures 42 formed therein wherein the apertures provide airflow through the underdrain for wastewater container 100 during air scouring thereof. The apertures 42 extend intermediate the first end and second end of the top member 40 and it should be understood within the scope of the present invention that various quantities apertures 42 could be formed in the top member 40.

A screen member 60 is present above the baffle member 30 being arcuate in shape. The screen member 60 is manufactured from wedge wire screen material and is operably coupled along the bottom edges thereof with the first longitudinal leg member 15 and second longitudinal leg member 17. The first longitudinal leg member 15 and second longitudinal leg member 17 and their inwards angle function to secure the screen member 60 in position. Screen member 60 functions to inhibit debris from passing therethrough while allowing water to egress past and enter the void 28 of the baffle member 30 through water apertures 80.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An underdrain configured to be placed at a bottom of a wastewater container wherein the underdrain comprises:
a base member, said base member having a bottom, said bottom of said base member being planar in manner having a first end and a second end, said base member having opposing lateral longitudinal edges, said base member having opposing lateral longitudinal leg members contiguously formed with said bottom extending upward from said opposing lateral longitudinal edges;

a baffle member, said baffle member having a first end and a second end being equivalent in length to said base member, said baffle member being superposed above said base member forming a void therebetween, said baffle member being manufactured from four contiguous portions, said four contiguous portions consisting of two inner portions, said two inner portions being contiguous along a center seam of the baffle member and having an obtuse angle between the two inner portions, said four contiguous portions further consisting of two outer portions, said two outer portions being on opposing sides of said inner portions, wherein one of said two outer portions is contiguous with a first of said two inner portions having an acute angle between said one of said two outer portions and said first of said two inner portions, and wherein a second one of said two outer portions is contiguous with a second of said two inner portions on an opposing side of said baffle member and having an acute angle between said second one of said two outer portions and said second of said two inner portions;

a top member, said top member being superposed a top end of said baffle member, said top member being planar in manner, said top member being equivalent in length to said baffle member, said top member having a multitude of apertures formed therein;

a screen member, said screen member being semi-annular in shape, said screen member being operably coupled to said base member along said opposing lateral longitudinal edges, said screen member extending over said baffle member, wherein said baffle member is M-shaped.

2. The underdrain configured to be placed at a bottom of a wastewater container as recited in claim 1, wherein said two outer portions of said four contiguous portions of said baffle member have water apertures formed therein, wherein said water apertures are present in said two outer portions intermediate said first end and said second end of said baffle member.

3. The underdrain configured to be placed at a bottom of a wastewater container as recited in claim 2, wherein said top member further includes opposing lateral longitudinal edges contiguously formed therewith on opposing sides thereof, said opposing lateral longitudinal edges extending downward from the top member and are adjacent said two outer portions.

4. The underdrain configured to be placed at a bottom of a wastewater container as recited in claim 3, wherein said opposing lateral longitudinal leg members of said base member extend angularly inwards towards a center of said base member.

5. The underdrain configured to be placed at a bottom of a wastewater container as recited in claim 4, wherein said screen member is manufactured from wedge wire.

6. The underdrain configured to be placed at a bottom of a wastewater container as recited in claim 5, wherein said top member extends across a void between said two inner portion of said four contiguous portions of said baffle member.

* * * * *